United States Patent Office 3,822,306
Patented July 2, 1974

3,822,306
PRODUCTION OF α-N-FORMYLAMINO ACID COMPOUNDS
Friedrich Becke, Heidelberg, and Peter Paessler, Ludwigshafen, Germany, assignors to Badische Anilin- & Soda-Fabrik Aktiengesellschaft, Ludwigshafen (Rhine), Germany
No Drawing. Filed Oct. 5, 1970, Ser. No. 78,208
Claims priority, application Germany, Oct. 6, 1969, P 19 50 280.8
Int. Cl. C07c 121/02
U.S. Cl. 260—465.4         6 Claims

ABSTRACT OF THE DISCLOSURE

Production of α-N-formylamino acid compounds by reacting cyanohydrins with formamide in the presence of acids at elevated temperature. The compounds obtainable by the process of the invention are valuable starting materials for the production of dyes and pesticides.

---

This invention relates to the production of α-N-formylamino acid compounds by reacting cyanohydrins with formamide in the presence of acids at elevated temperature.

It is known from Houben-Weyl, Methoden der Organischen Chemie, volume 11/2, page 339 (1958), that N-formyl compounds of amino acids can be prepared by heating the amino acid together with anhydrous formic acid. It is possible to eliminate the formyl radical under relatively mild conditions using a methanolic solution of hydrochloric acid at 20° C. α-N-formylaminoisovaleronitrile can be produced from N-formylvalinamide by elimination of water (J. Org. Chem. 30 (1965) 1905). A paper published in Ber., 90 (1957) 2510 ff., teaches that α-N-formylamino acid amides can be prepared by desulfurization of 2-thiohydantoins by means of Raney nickel. These processes either start from difficultly accessible substances or are unsatisfactory with regard to yield and uneconomical.

It is an object of this invention to provide a new process for the production of α-N-formylaminonitriles or α-N-formylamino acid amides in good yield and high purity.

This and other objects of the present invention are achieved and the production of α-N-formylamino acid compounds having the general formula

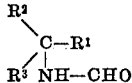

where $R^1$ denotes the group —CN or the group

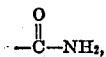

$R^2$ and $R^3$ may be identical or different and each denotes an aliphatic, cycloaliphatic, araliphatic, aromatic or heterocyclic radical, $R^2$ may also denote a hydrogen atom and $R^2$ and $R^3$ together with the adjacent carbon atom may be members of a ring, is advantageously carried out by reacting a cyanohydrin having the general formula

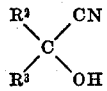

where $R^2$ and $R^3$ have the above meanings, with formamide in the presence of an acid at a temperature of from 60° to 180° C.

In the event of acetaldehyde cyanohydrin being used, the reaction may be represented by the following formulae:

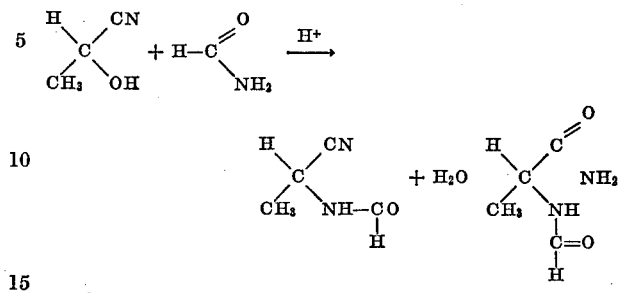

The process according to the invention surprisingly gives a large number of α-N-formylaminonitriles and α-N-formylamino acid amides in good yield and high purity in a simpler and more economical way than the prior art processes.

The cyanohydrins of the formula II are reacted with the stoichiometric amount or an excess of formamide, preferably with an excess of 2 to 3 moles of formamide per mole of cyanohydrin. Preferred cyanohydrins having the general formula II are those in whose formulae $R^1$ denotes the group —CN or the group

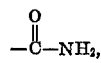

$R^2$ and $R^3$ may be identical or different and each denotes an alkyl radical having from 1 to 6 carbon atoms, a cycloalkyl radical having from 5 to 8 carbon atoms, an aralkyl radical having from 7 to 12 carbon atoms, a phenyl radical or a 5- or 6-membered heterocyclic radical which may contain a nitrogen atom or an oxygen atom, $R^2$ may also denote a hydrogen atom and $R^2$ and $R^3$ together with the adjacent carbon atom may be members of an alicyclic 5- or 6-membered ring. The said radicals or rings may bear as substituents groups which are inert under the reaction conditions, e.g. alkyl groups having from 1 to 4 carbon atoms and a heterocyclic 5- or 6-membered ring which is attached to the alkyl radical and which contains a nitrogen atom or an oxygen atom.

It is possible to use, instead of starting materials having the formula II, substances which yield cyanohydrins having the formula II, e.g. in the form of reaction mixtures of hydrocyanic acid and the appropriate aldehyde or ketone. Instead of hydrocyanic acid there may be used the corresponding amounts of a cyamide, e.g. potassium cyamide, and an acid, e.g. acetic acid. In a preferred embodiment of the process according to this invention a mixture of aldehyde or ketone, cyamide and acid is reacted in the presence or absence of a catalyst, e.g. potassium carbonate, and/or a solvent, e.g. dimethyl formamide, to form the cyanohydrin having the formula II. The reaction mixture, from which the cyanohydrin formed is not separated, has then added to it formamide and acid and the reaction in accordance with the present invention is carried out.

Specific examples of starting materials having the formula II are the cyanohydrins of acetaldehyde, propionaldehyde, n-butyraldehyde, isobutyraldehyde, n-valeraldehyde, isovaleraldehyde, 2-methylbutyraldehyde, phenylacetaldehyde, phenylpropionaldehyde, phenylisobutyraldehyde, phenylmethylacetaldehyde, α-pyrrolidonylpropionaldehyde, benzaldehyde, p-chlorobenzaldehyde, diethylketone, butanone, cyclohexanone, cyclohexylaldehyde, 2,6-dichlorobenzaldehyde, pyridine-2-aldehyde, furan-3-aldehyde, pyrrole-2-aldehyde, and furfural.

The reaction is carried out at a temperature of from 60° to 180° C., preferably from 100° to 160° C., at atmospheric or superatmospheric pressure and either continuously or batchwise. Acids suitable for the process according to the invention include a large number of organic and inorganic acids, those which do not oxidize under the reaction conditions being preferred. Preferred acids are alkanecarboxylic acids such as formic acid, acetic acid and propionic acid, and mineral acids such as hydrochloric acid, sulfuric acid and phosphoric acid. However, organic acids such as benzenesulfonic acid and p-toluenesulfonic acid, dicarboxylic acids such as oxalic acid and adipic acid, halogenated fatty acids such as chloroacetic acid and trifluoroacetic acid, may also be used. Generally the reaction is carried out using 0.001 to 10 moles of acid per mole of starting material having the formula II.

The reaction may be carried out as follows. A mixture of cyanohydrin having the formula II, formamide and acid is kept at the reaction temperature for 1 to 10 hours. The end product is then isolated from the reaction mixture by a conventional method, e.g. by fractional distillation or filtration. In the case of filtration, further amounts of end product may be obtained from the filtrate by concentration and the addition of suitable solvents, e.g. acetone and alcohol.

The reaction may be carried out in the same way using substances which yield cyanohydrins instead of the cyanohydrins themselves.

In the reaction there are formed first the nitriles having the formula I and only then the acid amides having the formula I. In the lower part of the abovementioned temperature range, e.g. below 120° C., at reaction times of from 1 to 5 hours and in the presence of small amounts of acid, e.g. less than 1 mole of acid per mole of starting material having the formula II, the nitriles I are predominantly formed. At temperatures above 120° C., at reaction times of from 5 to 10 hours and in the presence of more than 1 mole of acid per mole of starting material II, acid amides I are predominantly produced. When appropriate reaction conditions within the transitional ranges are chosen, there are obtained mixtures of the two amino acid compounds I, which can be separated by fractional distillation.

The compounds obtainable by the process according to this invention are valuable starting materials for the production of dyes are pesticides. They can be hydrolyzed to form α-amino acids under mild conditions, e.g. with an equivalent amount of dilute hydrochloric acid or 38 Bé. caustic soda solution at 40° to 100° C. during 2 to 5 hours. As regards the use of such α-amino acids, reference is made to Ullmanns Encyclopädie der technischen Chemie, volume 3, pages 500 ff.

The invention is illustrated by the following Examples, in which parts are by weight.

EXAMPLE 1

(a) 142 parts of acetaldehyde cyanohydrin is reacted in a stirred vessel with 200 parts of formamide in the presence of 30 parts of propionic acid for two hours at 110°–120° C. The reaction mixture is freed from excess formamide and distilled at subatmospheric pressure. 161 parts of N-formylalamine nitrile having a boiling point of 97° C. at 0.5 mm. Hg is obtained, which corresponds to a yield of 82% of the theory.

(b) In order to prepare the N-formylalamine amide, 142 parts of acetaldehyde cyanohydrin, 180 parts of formamide and 200 parts of formic acid are reacted in an autoclave at 130° C. for 3 hours. The reddish brown, clear reaction mixture is distilled to separate formic acid and excess formamide. The solidifying distillation residue is digested with acetone and the colorless, undissolved end product is filtered off with suction. 146 parts of N-formylalamine amide having a melting point of 128° C. is obtained, which corresponds to a yield of 64% of the theory.

EXAMPLE 2

(a) Analogously to Example 1, 99 parts of isobutyraldehyde cyanohydrin, 100 parts of formamide and 15 parts of propionic acid are reacted in a stirred vessel at 120° C. for two hours. 112 parts of N-formylvaline nitrile having a boiling point of 128° C. at 2 mm. Hg and a melting point of 38° C. is obtained (88% of the theory).

(b) Isolation of the pure cyanohydrin is dispensed with when 27 parts of hydrocyanic acid is introduced, while cooling, into 72 parts of isobutyraldehyde in the presence of 1 part of potassium carbonate. The mixture is stirred for 15 minutes at room temperature and then reacted as described under 2(a). 105 parts of N-formylvaline nitrile is obtained (equivalent to a yield of 83% of the theory).

(c) Analogously to Example 1(b), 198 parts of isobutyraldehyde cyanohydrin, 180 parts of formamide and 200 parts of formic acid are reacted in a stirred vessel at 120° C. for 10 hours. 170 parts of N-formylvaline amide having a melting point of 199° C. is obtained (59% of the theory).

EXAMPLE 3

(a) Analogously to Example 1(a), 226 parts of isovaleraldehyde cyanohydrin, 180 parts of formamide and 30 parts of formic acid are reacted in a stirred vessel at 90°–100° C. for 5 hours. 276 parts of N-formylleucine nitrile having a boiling point of 137° C. at 1 mm. Hg is obtained (86% of the theory).

(b) Analogously to Example 1(b), 113 parts of isovaleraldehyde cyanohydrin, 100 parts of formamide and 120 parts of formic acid are reacted in an autoclave at 130°–140° C. for 3 hours. 76 parts of N-formylleucine amide having a melting point of 179° C. is obtained (48% of the theory).

EXAMPLE 4

(a) Analogously to Example 1(a), 113 parts of 2-methylbutyraldehyde cyanohydrin, 100 parts of formamide and 15 parts of propionic acid are reacted in a stirred vessel at 120° C. for 3 hours. 115 parts of N-formylisoleucine nitrile having a boiling point of 118° C. at 0.6 mm. Hg is obtained (82.2% of the theory).

(b) Analogously to Example 1(b), 113 parts of 2-methylbutyraldehyde cyanohydrin, 100 parts of formamide, 100 parts of formic acid and 20 parts of water are reacted in a stirred vessel at 110° C. for 10 hours. 82 parts of N-formylisoleucine amide having a melting point of 190° C. is obtained (52% of the theory).

EXAMPLE 5

(a) Analogously to Example 1(a), 113 parts of n-valeraldehyde cyanohydrin, 100 parts of formamide and 10 parts of propionic acid are reacted in a stirred vessel at 110° C. for 5 hours. 125 parts of N-formylhomoleucine nitrile having a boiling point of 130°–135° C. at 0.6 mm. Hg is obtained (89% of the theory).

(b) Analogously to Example 1(b), 113 parts of n-valeraldehyde cyanohydrin, 100 parts of formamide, 100 parts of formic acid and 20 parts of water are reacted in a stirred vessel at 120° C. for 15 hours. 66.5 parts of N-formylhomoleucine amide having a melting point of 134° C. is obtained (42% of the theory).

EXAMPLE 6

140 parts of phenylacetaldehyde, 27 parts of hydrocyanic acid, 1 part of potassium carbonate and 2 parts of water are kept at 5° C. for two hours and at 25° C. for 15 minutes. Then 120 parts of formamide and 150 parts of formic acid are added. Analogously to Example 1(b) the mixture is reacted in a stirred vessel at 120° C. for 10 hours. 117 parts of N-formylphenylalamine amide having a melting point of 154° C. is obtained (61% of the theory).

EXAMPLE 7

(a) Analogously to Example 1(a), 85 parts of propionaldehyde cyanohydrin, 100 parts of formamide and 20 parts of acetic acid are reacted in a stirred vessel at 120° C. for 3 hours. 94.5 parts of α-N-formylaminobutyronitrile having a boiling point of 101° C. at 0.5 mm. Hg is obtained (84.5% of the theory).

(b) Analogously to Example 1(b), 85 parts of propionaldehyde cyanohydrin, 100 parts of formamide and 120 parts of formic acid are reacted in an autoclave at 130°–140° C. for 4 hours. 69.5 parts of α-N-formylaminobutyramide having a melting point of 153° C. is obtained (53.5% of the theory).

EXAMPLE 8

(a) Analogously to Example 6, 106 parts of benzaldehyde, 30 parts of hydrocyanic acid, 0.5 part of potassium carbonate and 2 parts of water are kept at 5° C. for 30 minutes and then at room temperature for 15 minutes. 100 parts of formamide and 100 parts of formic acid are added to this mixture. Analogously to Example 1(b) the mixture is reacted in a stirred vessel at 120° C. for 3 hours and worked up. 109 parts of N-formylphenylglycinamide having a melting point of 193° C. is obtained (61.3% of the theory).

(b) 106 parts of benzaldehyde is gradually added to a cooled mixture of 55 parts of sodium cyanide and 200 parts of formic acid. Then 135 parts of formamide is added and the mixture is reacted in a stirred vessel at 100° C. for 16 hours. The sodium formate formed is dissolved by adding 100 parts of ice water. Finally suction filtration is carried out and the resultant crystal slurry is recrystallized from water. 131 parts of N-formylphenylglycinamide having a melting point of 187°–190° C. is obtained (73.5% of the theory).

(c) Analogously to Example 6, 106 parts of benzaldehyde, 30 parts of hydrocyanic acid, 0.5 parts of potassium carbonate and 2 parts of water are kept at 5° C. for 30 minutes and at room temperature for 15 minutes. Then 120 parts of formamide and 30 parts of formic acid are added. The mixture is reacted in a stirred vessel at 120° C. for 4 hours. After removal of the more volatile unreacted or excess starting materials, the residue is recrystallized from water. 60 parts of N-formylglycine nitrile having a melting point of 92° C. (37.6% of the theory).

EXAMPLE 9

Analogously to Example 8(b), 98 parts of cyclohexanone is added to a cooled mixture of 55 parts of sodium cyanide and 200 parts of formic acid. Stirring of the mixture is continued at room temperature for 15 minutes. After addition of 135 parts of formamide the mixture is heated at 120° C. for 5 hours.

The precipitated sodium formate is filtered off with suction, the filtrate is concentrated, and the crystalline residue is treated with acetone. 92 parts of 1-N-formylaminocyclohexanecarboxylamide having a melting point of 159° C. is obtained (58.6% of the theory).

EXAMPLE 10

As described in Example 6, 50 parts of β-phenylpropionaldehyde, 11 parts of hydrocyanic acid, 0.3 part of potassium carbonate and 1 part of water are kept at 5° C. for 30 minutes and at room temperature for 15 minutes. Then 100 parts of formamide and 100 parts of formic acid are added. Analogously to Example 1(b) the mixture is reacted in a stirred vessel at 120° C. for 3 hours. 45 parts of α-N-formylamino-γ-phenylbutyramide having a melting point of 162° C. is obtained (58.5% of the theory).

EXAMPLE 11

As described in Example 6, 50 parts of β-phenylbutyraldehyde, 11 parts of hydrocyanic acid, 0.3 part of potassium carbonate and 1 part of water are kept at 5° C. for 30 minutes and then at room temperature for 15 minutes, whereupon 100 parts of formamide and 100 parts of formic acid are added. Analogously to Example 1(b) the mixture is reacted in a stirred vessel at 120° C. for 3 hours. 46 parts of α-N-formylamino-γ-phenylvaleramide having a melting point of 185° C. is obtained (62% of the theory).

EXAMPLE 12

Analogously to Example 6, 50 parts of α-pyrrolidonylpropionaldehyde, 0.2 part of potassium carbonate, 10 parts of hydrocyanic acid and 1 part of water are kept at 5° C. for 30 minutes and at room temperature for 15 minutes. Then 50 parts of formamide and 50 parts of formic acid are added. As indicated in Example 1(b), the mixture is reacted in a stirred vessel at 120° C. for 10 hours and then worked up. 20 parts of α-N-formylamino-γ-pyrrolidonyl-butyramide having a melting point of 236° C. is obtained (26.6% of the theory).

EXAMPLE 13

In accordance with Example 6, 50 parts of phenylmethylacetaldehyde, 10 parts of hydrocyanic acid, 0.2 part of potassium carbonate and 1 part of water are kept at 5° C. for 30 minutes and at room temperature for 15 minutes. 50 parts of formamide and 50 parts of formic acid are then added. Analogously to Example 1(b) the mixture is reacted in a stirred vessel at 120° C. for 10 hours. 12 parts of α-N-formyl-β-phenyl-β-methyl-alanine amide having a melting point of 189°–191° C. is obtained (15.6% of the theory).

EXAMPLE 14

8 parts of hydrocyanic acid is added to a mixture, cooled to 5° C., of 50 parts of 2,6-dichlorobenzaldehyde, 150 parts of dimethyl formamide, 0.3 part of potassium carbonate and 1 part of water. Then 100 parts of formamide and 100 parts of formic acid are added. Finally the mixture is heated at 120° C. in a stirred vessel for 3 hours. Working up is carried out as indicated in Example 1(b). 35.6 parts of N-formyl-2,6-dichlorophenyl glycinamide having a melting point of 184° C. is obtained (50.5% of the theory).

We claim:

1. A process for the production of α-N-formylamino acid compounds having the general formula I

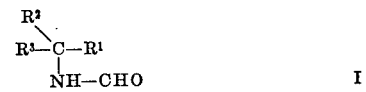

where $R^1$ denotes the group —CN, $R^2$ and $R^3$ may be identical or different and each denotes alkyl having 1 to 6 carbon atoms, cycloalkyl having 5 to 8 carbon atoms, aralkyl having 7 to 12 carbon atoms, phenyl, chlorophenyl or dichlorophenyl, $R_2$ may also denote a hydrogen atom wherein a cyanohydrin having the general formula II

where $R^2$ and $R^3$ have the above meanings, is reacted with formamide in the presence of less than 1 mole of an acid per mole of said cyanohydrin at a temperature of from 60° to 120° C. for 1–5 hours.

2. A process as claimed in claim 1 wherein the reaction is carried out using at least 0.001 to 10 mole of acid per mole of starting material II.

3. A process as claimed in claim 1 wherein $R^2$ denotes hydrogen and $R^3$ denotes alkyl having 1 to 6 carbon atoms, cycloalkyl having 5 to 8 carbon atoms, aralkyl having 7 to 12 carbon atoms, phenyl, chlorophenyl or dichlorophenyl.

4. A process for production of α-N-formylamino acid compounds having the general formula

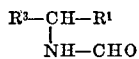
                                                    I wherein $R^1$ denotes the group —CN and $R^3$ denotes alkyl having 1–6 carbon atoms, where a cyanohydrin having the general formula

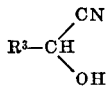
                                                    II where $R^3$ has the above meaning is reacted with formamide in the presence of less than 1 mole of said cyanohydrin at a temperature of from 60° to 120° C. for 1–5 hours.

5. A process as claimed in claim 4 wherein the reaction is carried out using at least 0.001 to 10 mole of acid per mole of starting material II.

6. A process as claimed in claim 4, wherein $R^3$ denotes methyl.

References Cited

UNITED STATES PATENTS

| | | | |
|---|---|---|---|
| 3,190,916 | 6/1965 | Rainer | 260—559 |
| 2,833,751 | 5/1958 | Luskin et al. | 260—465.4 |
| 3,496,172 | 2/1970 | Hinkley | 260—465.4 |

LEWIS GOTTS, Primary Examiner

E. G. LOVE, Assistant Examiner

U.S. Cl. X.R.

260—326.85, 464, 465 D, 561 A, 561 K, 561 R, 562 N

UNITED STATES PATENT AND TRADEMARK OFFICE
CERTIFICATE OF CORRECTION

PATENT NO. : 3,822,306
DATED : July 2, 1974
INVENTOR(S) : Friedrich Becke and Peter Paessler It is certified that error appears in the above-identified patent and that said Letters Patent are hereby corrected as shown below:

Column 6, line 56, "$R_2$" should read --$R^2$--.

Column 6, line 69, delete "to 10".

Column 8, line 2, delete "to 10".

Signed and sealed this 15th day of July 1975.

(SEAL)
Attest:

RUTH C. MASON
Attesting Officer

C. MARSHALL DANN
Commissioner of Patents
and Trademarks